US009306250B2

(12) United States Patent
Tao et al.

(10) Patent No.: US 9,306,250 B2
(45) Date of Patent: Apr. 5, 2016

(54) BATTERY COOLING STRUCTURE

(71) Applicants: KOBELCO CONSTRUCTION MACHINERY CO., LTD., Hiroshima-shi (JP); GS Yuasa International Ltd., Kyoto-shi (JP)

(72) Inventors: Hiroaki Tao, Hiroshima (JP); Naoki Goto, Ise (JP); Yoichiro Yamazaki, Hiroshima (JP); Yusuke Sawada, Hatsukaichi (JP); Yasutaka Miyawaki, Kyoto (JP); Hiroshi Yamashiro, Kyoto (JP)

(73) Assignees: KOBELCO CONSTRUCTION MACHINERY CO., LTD., Hiroshima-shi (JP); GS Yuasa International Ltd., Kyoto-shi (JP)

( * ) Notice: Subject to any disclaimer, the term of this patent is extended or adjusted under 35 U.S.C. 154(b) by 203 days.

(21) Appl. No.: 14/226,063

(22) Filed: Mar. 26, 2014

(65) Prior Publication Data

US 2014/0295241 A1 Oct. 2, 2014

(30) Foreign Application Priority Data

Mar. 27, 2013 (JP) ................................. 2013-066837

(51) Int. Cl.
| | | |
|---|---|---|
| H01M 10/50 | (2006.01) | |
| H01M 10/6554 | (2014.01) | |
| H01M 2/10 | (2006.01) | |
| H01M 10/625 | (2014.01) | |
| H01M 10/653 | (2014.01) | |
| H01M 10/647 | (2014.01) | |
| H01M 10/613 | (2014.01) | |

(52) U.S. Cl.
CPC ........ *H01M 10/5053* (2013.01); *H01M 2/1077* (2013.01); *H01M 10/613* (2015.04); *H01M 10/625* (2015.04); *H01M 10/647* (2015.04); *H01M 10/653* (2015.04); *H01M 10/6554* (2015.04); *H01M 2220/20* (2013.01)

(58) Field of Classification Search
CPC .......... H01M 10/5053; H01M 10/625; H01M 10/653; H01M 10/647; H01M 10/6554; H01M 10/613; H01M 2/1077; H01M 2220/20
See application file for complete search history.

(56) References Cited

U.S. PATENT DOCUMENTS

| | | | | |
|---|---|---|---|---|
| 3,250,929 A | * | 5/1966 | Maier .................. | H02K 11/046 310/64 |
| 2002/0034682 A1 | * | 3/2002 | Moores, Jr. ............. | B25F 5/008 429/120 |

(Continued)

FOREIGN PATENT DOCUMENTS

| | | |
|---|---|---|
| JP | 2011-34775 | 2/2011 |
| JP | 2012-181972 A | 9/2012 |

(Continued)

OTHER PUBLICATIONS

Extended European Search Report issued Jul. 10, 2014 in Patent Application No. 14161644.1

*Primary Examiner* — Raymond Alejandro
(74) *Attorney, Agent, or Firm* — Oblon, McClelland, Maier & Neustadt, L.L.P.

(57) ABSTRACT

A protrusion 53 is shaped to protrude from a main body 51 toward a supporter non-contact part 23 so as to circumvent a supporter 30. The protrusion 53 includes a protrusion heat transfer surface 55 which is a surface on the battery heat transfer surface 20 side (i.e., an upper side Y2). A heat conduction member 40 contacts with the supporter non-contact part 23 and the protrusion heat transfer surface 55.

2 Claims, 8 Drawing Sheets

(56) References Cited

U.S. PATENT DOCUMENTS

2012/0244404 A1* 9/2012 Obasih .................. B60L 3/0046
429/99
2013/0143079 A1* 6/2013 Huang ................ H01M 2/1077
429/61

FOREIGN PATENT DOCUMENTS

WO  WO 2012/118015  A1   9/2012
WO  WO 2012/133709  A1   10/2012

* cited by examiner

FIG. 7
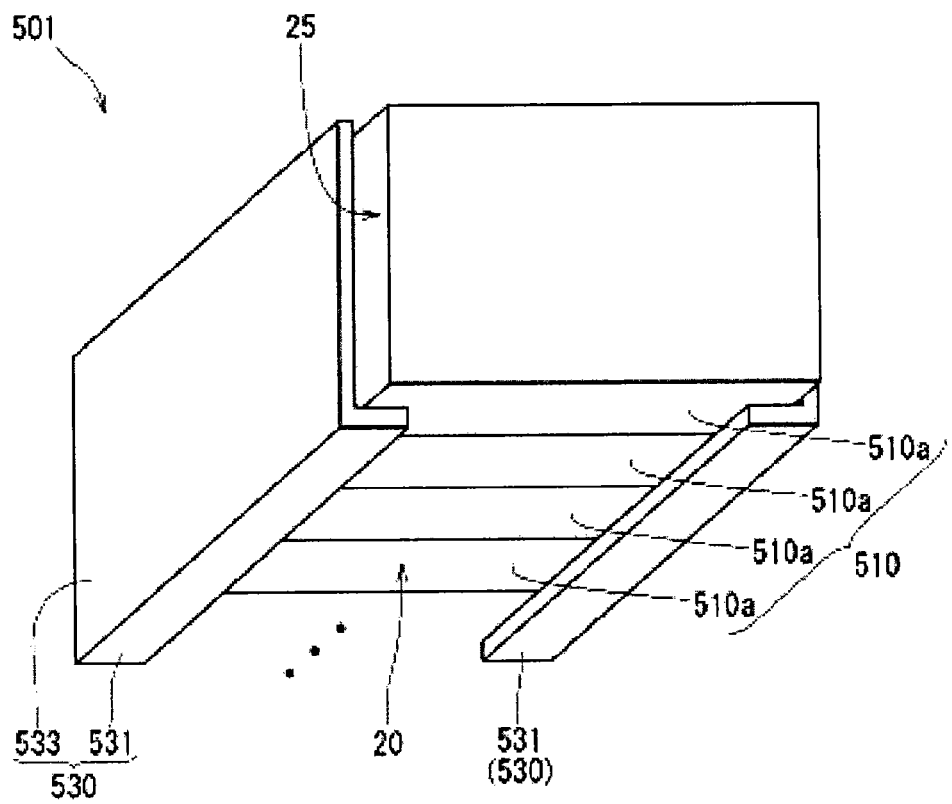
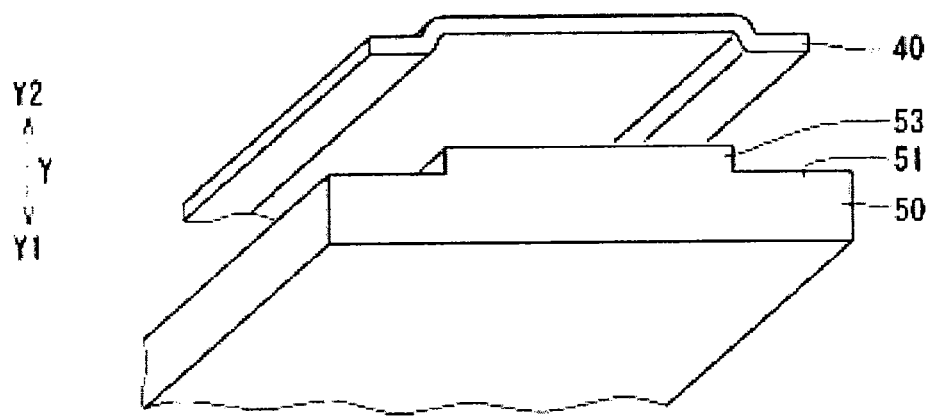

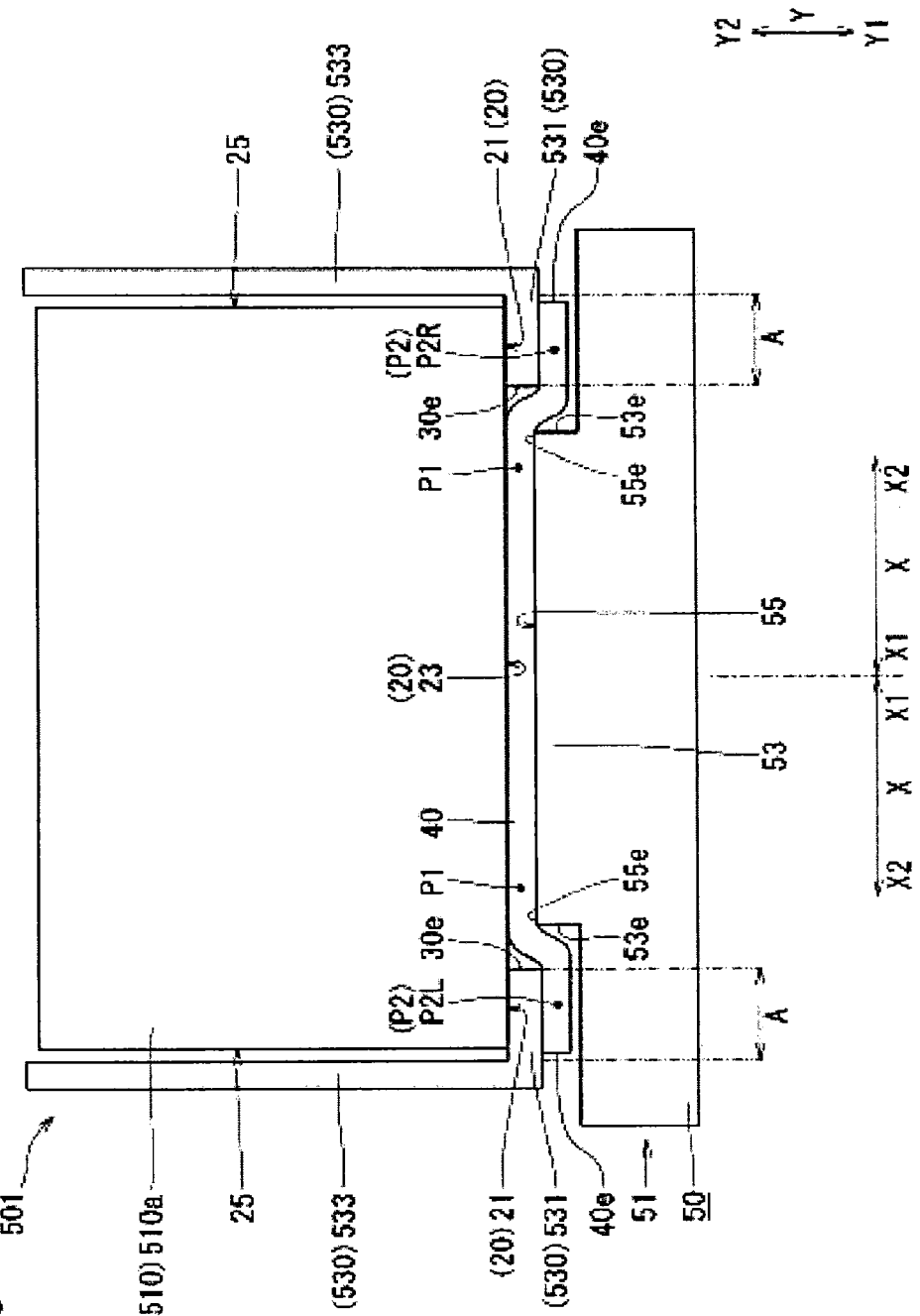

BATTERY COOLING STRUCTURE

CROSS REFERENCE TO RELATED APPLICATION

The present application claims priority from Japanese Patent Application No. 2013-066837, which was filed on Mar. 27, 2013, the disclosure of which is herein incorporated by reference in its entirety.

BACKGROUND OF THE INVENTION

The present invention relates to a battery cooling structure for cooling a battery.

Patent Literature 1 (Japanese Unexamined Patent Publication No. 2011-34775) recites a known battery cooling structure. The "Solution" in "Abstract" of this literature recites as follows (hereinafter, the reference numerals described in Patent Literature 1 will be put in parentheses). "A bottom surface supporter (35) for supporting the bottom surface of a square battery (10) is provided, . . . a notch (36) is formed in the bottom surface supporter (35) on the cooling surface (41) side so that the surface of the square battery (10) which surface is on the cooling surface (41) side is exposed, a heat conduction sheet is arranged to contact with the cooling surface (41) of the battery pack (11) through the notch (36), and a cooling plate is arranged to contact with the heat conduction sheet". With this arrangement, the literature aims at achieving "efficiency cooling of the battery pack using the cooling plate" (see "Problem" in "Abstract" of the literature).

SUMMARY OF THE INVENTION

The invention recited in Patent Literature 1, however, is disadvantageous in the cost for providing the heat conduction sheet. More specifically, as shown in FIG. 5 and FIG. 13 of the literature, the bottom surface supporter (35) protrudes toward a cooling plate (12) (heat sink) as compared to the cooling surface (41) (battery heat transfer surface) of the battery pack (11). For this reason, when the heat conduction sheet (40) (heat conduction member) is thin, a gap exists between the cooling surface (41) and the cooling plate (12), with the result that the battery pack (11) is not sufficiently cooled. To ensure the cooling capability, it is necessary to arrange the height (H1) of the heat conduction sheet (40) to be sufficiently high. This, however, increases the cost of the heat conduction sheet (40).

An object of the present invention is to provide a battery cooling structure which is able to ensure the battery cooling capability while reducing the cost of the heat conduction member.

A battery cooling structure of the present invention includes: a battery; a heat sink; an insulating supporter provided between the battery and the heat sink and supporting the battery; and an insulating heat conduction member provided between the battery and the heat sink; The battery has a battery heat transfer surface which is a surface on the heat sink side. The battery heat transfer surface includes: a supporter contact part with which the supporter contacts; and a supporter non-contact part which is different from the supporter contact part and with which part the supporter does not contact. The heat sink includes: a main body; and a protrusion which is shaped to protrude from the main body toward the supporter non-contact part so as to circumvent the supporter. The protrusion includes a protrusion heat transfer surface which is a surface on the battery heat transfer surface side. The heat conduction member contacts with the supporter non-contact part and the protrusion heat transfer surface.

The structure above makes it possible to ensure the cooling capability of the battery and reduce the cost for the heat conduction member.

BRIEF DESCRIPTION OF THE DRAWINGS

FIG. 7 is a perspective showing a battery cooling structure 501 of Fifth Embodiment in a disassembled state.

FIG. 8 shows the battery cooling structure 501 of Fifth Embodiment.

DESCRIPTION OF THE PREFERRED EMBODIMENTS

First Embodiment

A battery cooling structure 1 of First Embodiment will be described with reference to FIG. 1 and FIG. 2.

Figure 1:
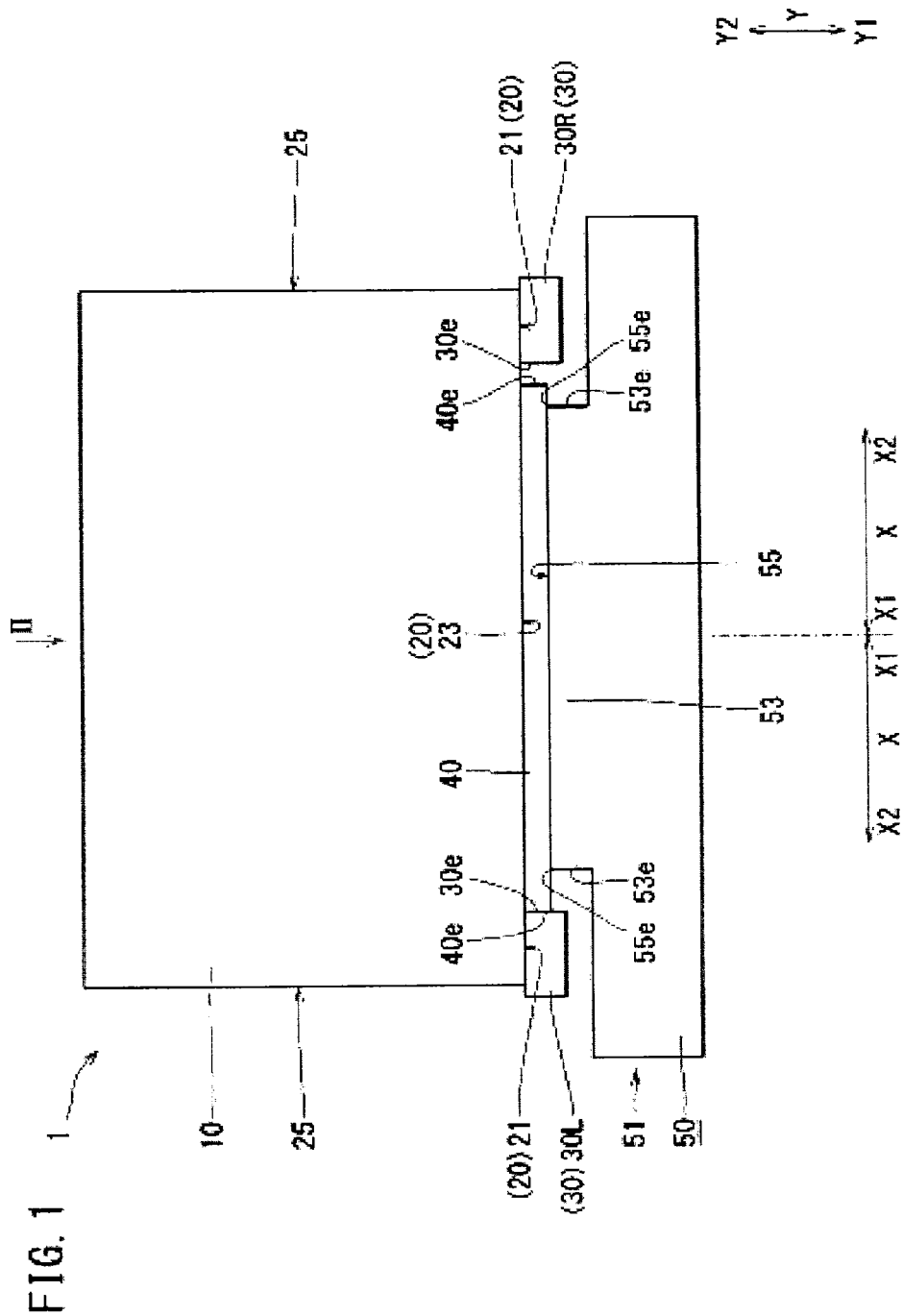
FIG. 1 shows a battery cooling structure 1 of First Embodiment.

The battery cooling structure 1 is a structure for cooling (adjusting the temperature of) a battery 10 shown in FIG. 1. The battery cooling structure 1 is provided, for example, in a vehicle. An example of the vehicle is a working vehicle, and an example of the working vehicle is an excavator. Examples of the excavator include a hybrid excavator (which utilizes an engine power and an electric power) and an electric excavator. The battery cooling structure 1 includes a battery 10, a supporter 30, a heat conduction member 40, and a heat sink 50.

The battery 10 is, for example, a storage battery. The battery 10 generates heat when it is charged or discharged. The battery 10 is, for example, rectangular parallelepiped in shape. The surfaces of the battery 10 include a battery heat transfer surface 20 and side surfaces 25.

The battery heat transfer surface 20 is a surface on the heat sink 50 side among the surfaces of the battery 10. The battery heat transfer surface 20 is a planer (or substantially planar) surface. The battery heat transfer surface 20 is, for example, the bottom surface of the battery 10.

(Battery Width Direction X and battery up-down direction Y) Hereinafter, a direction which is in parallel to the battery heat transfer surface 20 and extends along the linear line connecting a supporter 30L (described later) with a supporter 30R (described later) (i.e., the left-right direction in FIG. 1) will be referred to as a "battery width direction X". In regard to the battery width direction X, a side of each supporter 30 closer to the central part of the battery heat transfer surface 20 will be referred to as "inside X1" whereas a side of the central part closer to each supporter 30 will be referred to as "outside X2". The direction orthogonal to the battery heat transfer surface 20 will be referred to as a "battery up-down direction Y". In regard to the battery up-down direction Y, a side of the battery 10 closer to the heat sink 50 will be referred to as "lower side Y1" whereas a side of the heat sink 50 closer to the battery 10 will be referred to as "upper side Y2". It is noted that the battery up-down direction Y may not be the vertical direction (may be, for example, the horizontal direction).

The battery heat transfer surface 20 includes supporter contact parts 21 and a supporter non-contact part 23.

Each supporter contact part 21 is a part of the battery heat transfer surface 20 with which part a supporter 30 contacts. The supporter non-contact part 23 is a part different from the supporter contact parts 21 on the battery heat transfer surface 20, with which part a supporter 30 does not contact.

Each side surface 25 is adjacent to the battery heat transfer surface 20. The side surface 25 is orthogonal to the battery width direction X.

The supporters 30 support (retain) the battery 10. For example, the supporters 30 support a plurality of unit batteries 510a (see FIG. 7) which will be described later (in Fifth Embodiment). Alternatively, for example, the supporters 30 support the battery 10 with respect to the outside of the battery cooling structure 1. The supporters 30 support the battery heat transfer surface 20 from the lower side Y1. The supporters 30 are insulating members. The supporters 30 are made of, for example, synthetic resin such as ABS resin. Each supporter 30 is, for example, rectangular parallelepiped in shape, such as a plate.

This supporters 30 are provided between the battery 10 and the heat sink 50. Each supporter 30 contacts with the supporter contact part 21 of the battery heat transfer surface 20. The supporters 30 contact with (two) end portions of the battery heat transfer surface 20 in the battery width direction X. The left supporter 30 in FIG. 1 will be referred to as a supporter 30L, whereas the right supporter 30 in the figure will be referred to as a supporter 30R. The supporters 30 are disposed so that a gap (in the battery up-down direction Y) exists between a main body 51 (described later) of the heat sink 50 and each supporter 30. Each supporter 30 is disposed so that the end portion thereof protrudes to the outside X2 as compared to the end of the battery heat transfer surface 20 in the battery width direction X. This improves the insulation between the side surfaces 25 of the battery 10 and the heat sink 50. An edge of each supporter 30 which edge is on the protrusion 53 (described later) side in the battery width direction X (i.e., the edge on the inside X1) will be referred to as an edge 30e.

The heat conduction member 40 is a member provided for transferring heat between the heat sink 50 and the battery 10. This heat conduction member 40 is provided (sandwiched) between the battery 10 and the heat sink 50. The heat conduction member 40 contacts with (is directly pressed onto) the supporter non-contact part 23 and a protrusion heat transfer surface 55 (described later). That is to say, no gap exists between the heat conduction member 40 and the supporter non-contact part 23 and no gap exists between the heat conduction member 40 and the protrusion heat transfer surface 55. In the present case, the height of each supporter 30 (i.e., the length in the battery up-down direction Y) is at most equal to the sum of the height of the protrusion 53 (described later) and the height (thickness) of the heat conduction member 40. As detailed below, the heat conduction member 40 contacts with the entirety of the protrusion heat transfer surface 55 (described later) inside an outline 23o (see FIG. 2, described later). The heat conduction member 40 is a thin plate (sheet) in shape. The heat conduction member 40 is insulating. The heat conduction member 40 is highly heat conductive (and has higher heat conductivity than the supporters 30). The heat conduction member 40 is made of materials including, for example, silicon and alumina. The heat conduction member 40 is elastic (and has higher elasticity than the supporter 30). This elasticity allows the heat conduction member 40 to closely contact with the protrusion heat transfer surface 55 (described later) and the supporter non-contact part 23. The heat conduction member 40 is soft and easily bendable (i.e., flexible). (Bending the heat conduction member 40 is easier than bending the supporters 30.) Edges of the heat conduction member 40 in the battery width direction X will be referred to as edges 40e.

The heat sink 50 is provided for radiating the heat transferred from the battery 10 through the heat conduction member 40. The heat sink 50 is provided in the vicinity of the battery 10 (on the lower side Y1 of the battery 10). The heat sink 50 is made of a material suitable for heat radiation, e.g., metal. A surface of the heat sink 50 on the upper side Y2 is conductive. The heat sink 50 includes a main body 51 and a protrusion 53.

The main body 51 is, for example, a part occupying most of the heat sink 50. The main body 51 is, for example, rectangular parallelepiped in shape.

The protrusion 53 is shaped to protrude from the main body 51 toward the battery heat transfer surface 20 (toward the upper side Y2). The protrusion 53 is shaped to protrude from the main body 51 toward the supporter non-contact part 23. The protrusion 53 is shaped to protrude so as to circumvent the supporter 30. The protrusion 53 protrudes from a surface of the main body 51 which surface is on the upper side Y2. The protrusion 53 is, for example, rectangular parallelepiped in shape (or has a truncated pyramid shape which is not illustrated). Edges of the protrusion 53 in the battery width direction X will be referred to as edges 53e. The protrusion 53 includes a protrusion heat transfer surface 55.

The protrusion heat transfer surface 55 is a surface of the protrusion 53 which surface is on the battery 10 side (i.e., on the upper side Y2). The protrusion heat transfer surface 55 is planar in shape (or substantially planar in shape). Edges of the protrusion heat transfer surface 55 in the battery width direction X will be referred to as edges 55e.

(Outlines of Members and Conditions of Edges)

Figure 2:
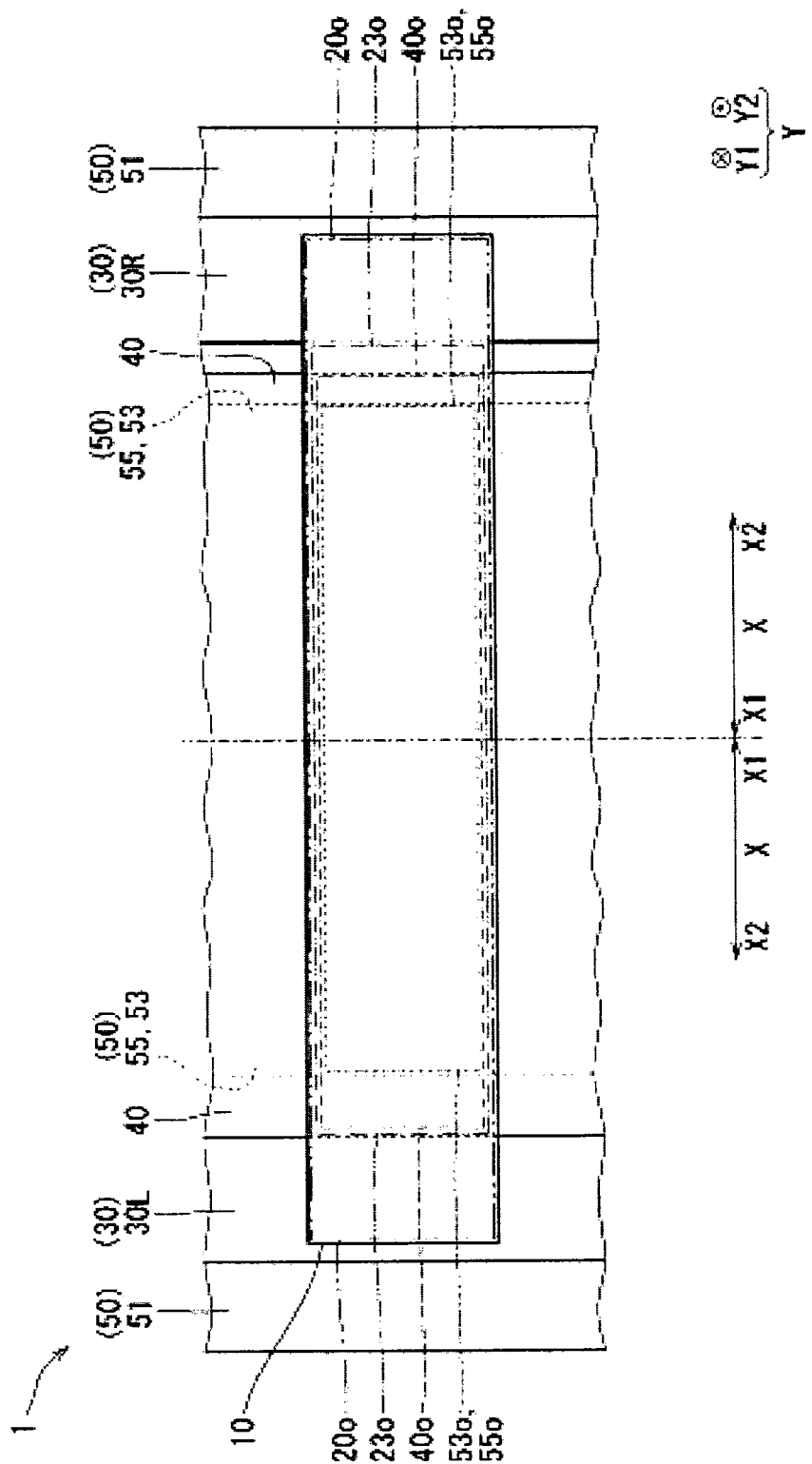
FIG. 2 shows the battery cooling structure 1 in the direction indicated by the arrow II in FIG. 1.

Now, as shown in FIG. 2, when viewed in the direction orthogonal to the protrusion heat transfer surface 55 (i.e., in the battery up-down direction Y), the outline (contour) of the battery heat transfer surface 20 will be referred to as an outline 20o, the outline of the supporter non-contact part 23 will be referred to as an outline 23o, the outline of the protrusion 53 will be referred to as an outline 53o, and the outline of the protrusion heat transfer surface 55 will be referred to as an outline 55o. In FIG. 2, these outlines are indicated by two dot chain lines, and each outline is schematically shown (i.e., downsized) to prevent the lines from overlapping one another. Furthermore, hereinafter, the edges 30e, the edges 40e, and the edges 55e will be regarded as being in parallel to the battery up-down direction Y (and hence the outline 53o completely overlaps the outline 55o).

(Position of heat conduction member 40 with respect to supporter non-contact part 23) The outline 40o of the heat conduction member 40 is positioned inside the outline 23o of the supporter non-contact part 23. In this regard, when one outline is "positioned inside" another outline, there are two cases (α) and (β). (α) One outline (in its entirety) is positioned inside another outline (in its entirety). (β) At least a part of one outline overlaps (coincides with) another outline.

As the outline 40o is positioned inside the outline 23o, the edges 40e of the heat conduction member 40 and the edges 30e of the supporter 30 shown in FIG. 1 are arranged as indicated by either (α1) or (β1).

(α1) Between an edge 40*e* and an edge 30*e*, a gap exists in the battery width direction X (see the left side of the supporter 30R in FIG. 1). As a result, the battery heat transfer surface 20 is exposed.

(β1) An edge 40*e* may contact with an edge 30*e* (see the right side of the supporter 30L in FIG. 1). In this case, the battery heat transfer surface 20 is not exposed.

(Position of protrusion 53 with respect to supporter non-contact part 23) As shown in FIG. 2, the outline 53*o* of the protrusion 53 is positioned inside the outline 23*o* of the supporter non-contact part 23. That is to say, as described above, the protrusion 53 is shaped to protrude from the main body 51 toward the supporter non-contact part 23 so as to circumvent the supporter 30.

As the outline 53*o* is positioned inside the outline 23*o*, the edges 53*e* of the protrusion 53 and the edges 30*e* of the supporter 30 shown in FIG. 1 are arranged as indicated by either (α2) or (α2).

(α2) A gap exists between an edge 53*e* and an edge 30*e* (in the battery width direction X).

(β2) An edge 53*e* may contact with an edge 30*e* (not illustrated). The protrusion 53 in this case is also encompassed within the range indicated by the phrase "shaped to protrude so as to circumvent the supporter 30".

(Position of protrusion heat transfer surface 55 with respect to heat conduction member 40) As shown in FIG. 2, the outline 55*o* of the protrusion heat transfer surface 55 is positioned inside the outline 40*o* of the heat conduction member 40. As a result, the heat conduction member 40 shown in FIG. 1 contacts with the entirety of the protrusion heat transfer surface 55 (i.e., covered with the protrusion heat transfer surface 55). In this connection, a part where this condition must be satisfied is the inside of the outline 23*o* of the supporter non-contact part 23 shown in FIG. 2. Outside the outline 23*o*, the heat conduction member 40 is not required to contact with the protrusion heat transfer surface 55. Outside the outline 23*o*, the outline 55*o* is not required to be positioned inside the outline 40*o*.

Because the outline 55*o* is positioned inside the outline 40*o*, the edges 55*e* of the protrusion heat transfer surface 55 and the edges 40*e* of the heat conduction member 40 shown in FIG. 1 are arranged as indicated by either (α3) or (β3) below.

(α3) An edge 55*e* is on the inside X1 of an edge 40*e*. That is to say, an edge 40*e* is closer to the supporter 30 (outside X2) than an edge 55*e* in the battery width direction X.

(β3) An edge 55*e* may be flush with an edge 40*e* (in the battery width direction X). When an edge 30*e* contacts with an edge 53*e* (i.e., in the case of (β2) above), the edges are arranged as in (β3) rather than in (α3).

(Effects 1)

Now, effects of the battery cooling structure 1 shown in FIG. 1 will be described. The battery cooling structure 1 includes a battery 10, a heat sink 50, insulating supporters 30 which are provided between the battery 10 and the heat sink 50 and support the battery 10, and an insulating heat conduction member 40 which is provided between the battery 10 and the heat sink 50. The battery 10 is provided with a battery heat transfer surface 20 which is a surface on the heat sink 50 side (lower side Y1). The battery heat transfer surface 20 includes supporter contact parts 21 with which the supporters 30 contact and a supporter non-contact part 23 which is different from the supporter contact part 21 and with which the supporter 30 does not contact. The heat sink 50 includes a main body 51 and a protrusion 53.

[Structure 1-1] The protrusion 53 is shaped to protrude from the main body 51 toward the supporter non-contact part 23 so as to circumvent the supporter 30.

[Structure 1-2] The protrusion 53 has a protrusion heat transfer surface 55 which is a surface on the battery heat transfer surface 20 side (upper side Y2). The heat conduction member 40 contacts with the supporter non-contact part 23 and the protrusion heat transfer surface 55.

The battery cooling structure 1 has the [Structure 1-1] above. On this account, even if the supporters 30 are provided on the battery heat transfer surface 20, the distance between the heat sink 50 (protrusion 53) and the supporter non-contact part 23 is short as compared to cases where no protrusion 53 is formed.

The battery cooling structure 1 has the [Structure 1-2] above. In the [Structure 1-2], because the heat conduction member 40 contacts with the supporter non-contact part 23 and the protrusion heat transfer surface 55, heat is certainly transferred from the battery heat transfer surface 20 to the heat sink 50 (protrusion heat transfer surface 55) via the heat conduction member 40. This ensures the cooling capability of the battery 10.

The battery cooling structure 1 includes the [Structure 1-1] above and the [Structure 1-2] above. This makes it possible to reduce the thickness of the heat conduction member 40 while maintaining the cooling capability of the battery 10. The cost of the heat conduction member 40 is therefore reduced.

(Another Effect 1)

When the structure indicated by (β1) (see the supporter 30L and its surroundings in FIG. 1) is employed, the following effect is achieved. [Structure β1] an edge 30*e* on the protrusion 53 side of the supporter 30 in the battery width direction X contacts with an edge 40*e* of the heat conduction member 40 in the battery width direction X.

In case of the [Structure β1] above, the insulation between the battery heat transfer surface 20 and the heat sink 50 is ensured between the edge 30*e* and the edge 40*e* as compared to a case where the battery heat transfer surface 20 is exposed through a gap between the edge 30*e* and the edge 40*e* (i.e., a gap in the battery width direction X) (see (α1) and the supporter 30R and its surroundings in FIG. 1).

(Another Effect 2)

When the structure indicated by (α1) (see the supporter 30R and its surroundings in FIG. 1) is employed, the following effect is achieved.

[Structure α1] The battery heat transfer surface 20 is exposed through a gap between the edge 30*e* and the edge 40*e*.

The protrusion 53 of the [Structure 1-1] above makes it possible to increase the spatial distance between the main body 51 and the battery heat transfer surface 20. On this account, even if the gap of [Structure α1] above exists, the insulation between the battery heat transfer surface 20 and the heat sink 50 is improved.

(Another Effect 3)

When both of the structures (α1) and (α3) above are employed, the following effect is achieved.

[Structure α1] The battery heat transfer surface 20 is exposed through a gap between the edge 30*e* and the edge 40*e* (i.e., a gap in the battery width direction X).

[Structure α3] The edge 40*e* of the heat conduction member 40 is closer to the supporter 30 (outside X2) than the edge 55*e* of the protrusion heat transfer surface 55.

On account of the part of the heat conduction member 40 in [Structure α3] which part is closer to the supporter 30 than the edge 55*e*, the creeping distance between the battery heat transfer surface 20 and the protrusion heat transfer surface 55 is elongated. This makes it possible to improve the insulation between the battery heat transfer surface 20 and the heat sink 50 even if there is the gap of the [Structure α1] above.

(Another Effect 4)

The heat conduction member 40 contacts with the entirety of the protrusion heat transfer surface 55 inside the outline 23o (see FIG. 2) of the supporter non-contact part 23 when viewed in the direction orthogonal to the supporter non-contact part 23 (i.e., when viewed in the battery up-down direction Y).

This structure ensures the insulation between the protrusion heat transfer surface 55 and the battery heat transfer surface 20.

Second Embodiment

Figure 3:
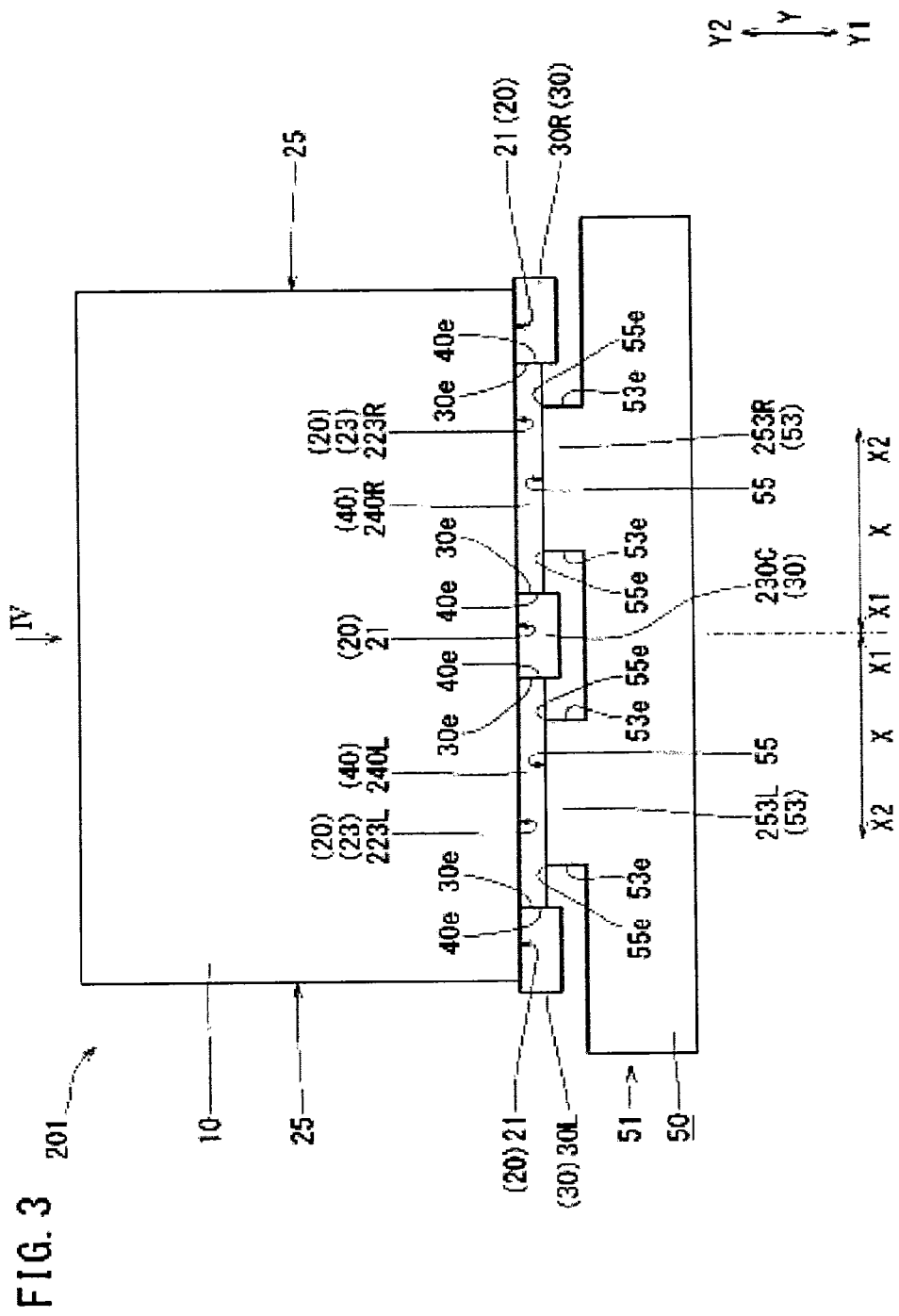
FIG. 3 shows a battery cooling structure 201 of Second Embodiment.
Figure 4:
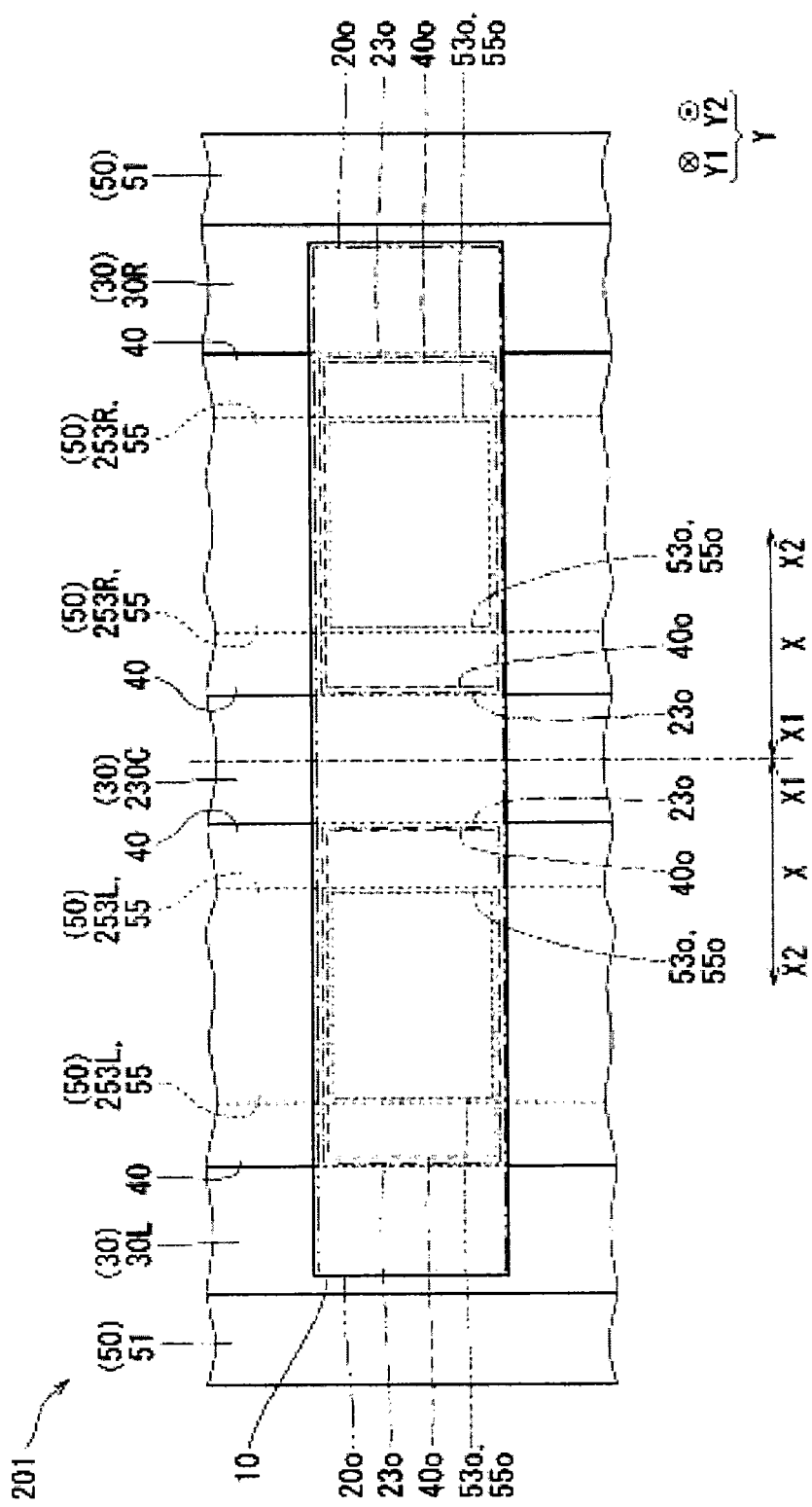
FIG. 4 shows the battery cooling structure 201 in the direction indicated by the arrow IV in FIG. 3.

Referring to FIG. 3 and FIG. 4, differences between a battery cooling structure 201 of Second Embodiment and the battery cooling structure 1 (see FIG. 1) of First Embodiment will be described. The differences lie in a supporter 230C, a protrusion 253L, a protrusion 253R, a heat conduction member 240L, and a heat conduction member 240R. These differences will be further described below.

The supporter 230C is provided between the supporter 30L and the supporter 30R. For example, one supporter 230C is provided at the central part of the battery heat transfer surface 20 in the battery width direction X. The number of the supporters 230C may be two or more (hereinafter, the number of the supporters 230C is assumed to be one). In connection with the above, in the supporter non-contact part 23, a part between the supporter 30L and the supporter 230C will be referred to as a supporter non-contact part 223L whereas a part between the supporter 30R and the supporter 230C will be referred to as a supporter non-contact part 223R.

A protrusion 253L and a protrusion 253R are shaped to circumvent the supporter 30L, the supporter 30R, and the supporter 230C. The protrusion 253L is shaped to protrude from the main body 51 toward the supporter non-contact part 223L. The protrusion 253R is shaped to protrude from the main body 51 toward the supporter non-contact part 223R. The battery cooling structure 201 may be paraphrased such that the central portion in the battery width direction X of the protrusion 53 of the battery cooling structure 1 shown in FIG. 1 is recessed.

As shown in FIG. 3, the heat conduction member 240L and the heat conduction member 240R are disposed as follows. The heat conduction member 240L contacts with the protrusion heat transfer surface 55 of the protrusion 253L and the supporter non-contact part 223L. The heat conduction member 240R contacts the protrusion heat transfer surface 55 of the protrusion 253R and the supporter non-contact part 223R.

The edges (edges 30e, edges 40e, edges 53e, and edges 55e) are disposed in the same manner as in First Embodiment. For example, although FIG. 3 shows that the edge 40e contacts with the edge 30e, a gap may exist between the edge 40e and the edge 30e. FIG. 4 shows the battery cooling structure 201 viewed in the battery up-down direction Y (viewed from the upper side Y2). The outline 40o, the outline 53o, and the outline 55o are disposed in the same manner as in First Embodiment above.

Third Embodiment

Figure 5:
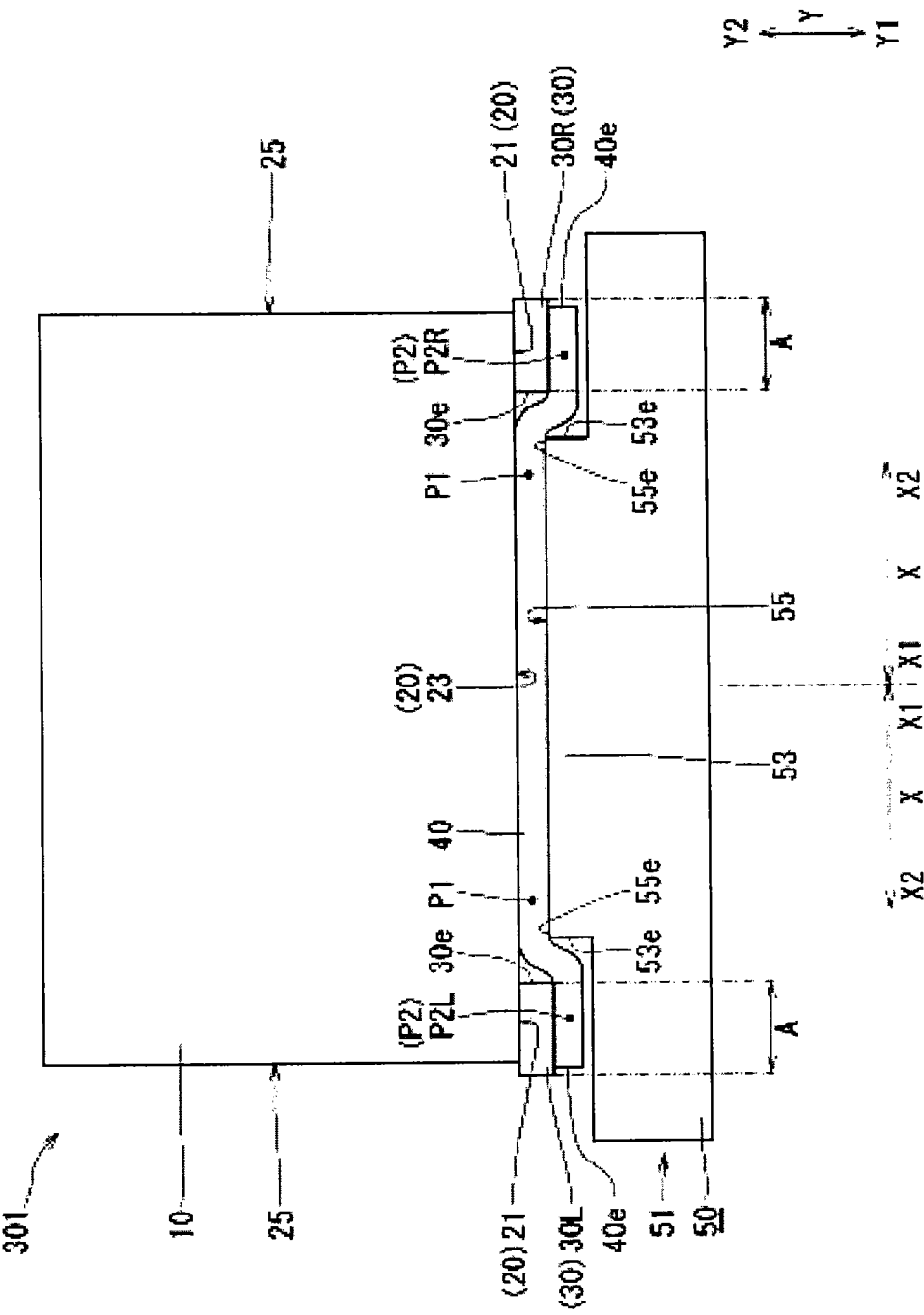
FIG. 5 shows a battery cooling structure 301 of Third Embodiment.

Referring to FIG. 5, a difference between a battery cooling structure 301 of Third Embodiment and the battery cooling structure 1 (see FIG. 1) of First Embodiment will be described. The difference lies in the positions of the edges 40e of the heat conduction member 40. The difference will be further described below.

The heat conduction member 40 is disposed to be successive (without any gaps) between a position P1 and a position P2 which are described below. The position P1 locates between the protrusion heat transfer surface 55 and the supporter non-contact part 23. The position P1 is a part of the heat conduction member 40 which part contacts with (is sandwiched between) the protrusion heat transfer surface 55 and the supporter non-contact part 23. The position P2 locates between the main body 51 of the heat sink 50 and the supporter 30. As the heat conduction member 40 is disposed at the position P2, there are regions A where the supporters 30 overlap the heat conduction member 40, when viewed in the direction orthogonal to the protrusion heat transfer surface 55 (i.e., in the battery up-down direction Y). Furthermore, as the heat conduction member 40 is disposed at the position P2, the edges 40e are on the outside X2 of the edges 30e of the supporter 30. While in FIG. 5 the heat conduction member 40 contacts with the surface on the lower side Y1 of each supporter 30, the heat conduction member 40 may not contact with the surface on the lower side Y1 of each supporter 30. Furthermore, regarding the positions P2, a part between the supporter 30L and the main body 51 will be referred to as a position P2L and a part between the supporter 30R and the main body 51 will be referred to as a position P2R.

(Effect 2)

Now, effects of the battery cooling structure 301 will be described.

[Structure 2] The heat conduction member 40 is disposed to be successive between the position P1 which is between the protrusion heat transfer surface 55 and the supporter non-contact part 23 and the position P2 which is between the main body 51 of the heat sink 50 and the supporter 30.

The battery cooling structure 301 has this [Structure 2]. In the [Structure 2], the heat conduction member 40 is provided between the position P1 and the position P2. This ensures the insulation between an edge 55e of the protrusion heat transfer surface 55 and an edge 30e of the supporter 30.

More specifically, in First Embodiment shown in FIG. 1, when there is a gap in the battery width direction X between the edge 40e of the heat conduction member 40 and the edge 30e of the supporter 30((α1), see the supporter 30R and its surroundings in FIG. 1), the battery heat transfer surface 20 is exposed. It is therefore necessary to insulate this exposed part from the heat sink 50. In the meanwhile, in the battery cooling structure 301 shown in FIG. 5, the exposed part is insulated by the heat conduction member 40. Furthermore, it is unnecessary to increase the thickness of the heat conduction member 40 to insulate the exposed part.

Fourth Embodiment

Figure 6:
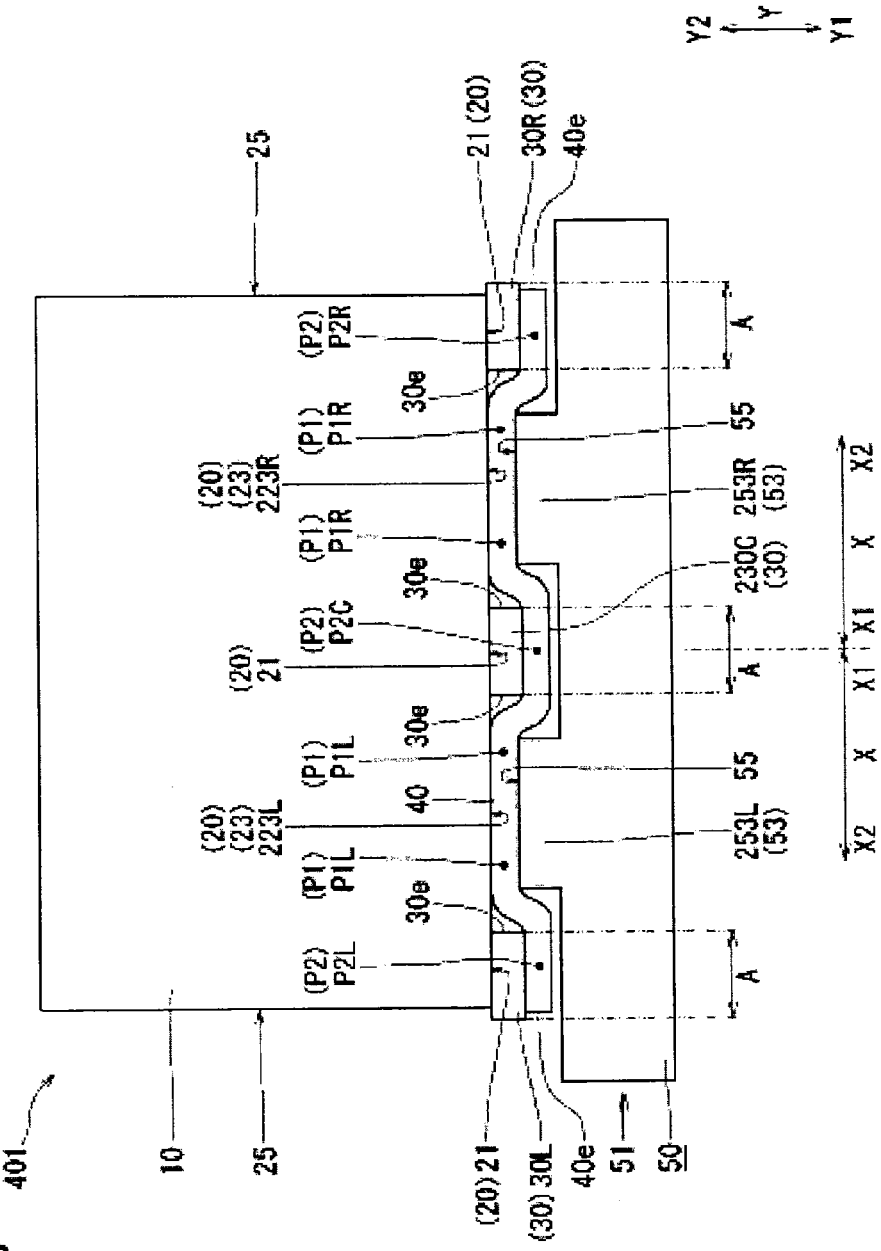
FIG. 6 shows a battery cooling structure 401 of Fourth Embodiment.

Referring to FIG. 6, a difference between a battery cooling structure 401 of Fourth Embodiment and the battery cooling structure 301 (see FIG. 5) of Third Embodiment will be described. The difference lies in a supporter 230C (and its surroundings) which has been described in Second Embodiment (see FIG. 3). The difference will be further described.

The heat conduction member 40 is disposed to be successive between a position P1L and a position P2C which will be described later. The heat conduction member 40 is disposed to be successive between a position P1R and a position P2C which will be described later. The position P1L locates between the protrusion 253L and the supporter non-contact part 223L. The position P1R locates between the protrusion 253R and the supporter non-contact part 223R. The position P2C locates between the supporter 230C and the main body 51. The number of the heat conduction members 40 is one, for example. That is to say, the heat conduction member 40 is disposed to be successive between the position P2L and the position P2R. Alternatively, the number of the heat conduction members 40 may be two (not illustrated). More specifically, the heat conduction member 40 may be divided in the battery width direction X at the position P2C.

Fifth Embodiment

Referring to FIG. 7 and FIG. 8, differences between a battery cooling structure 501 of Fifth Embodiment and the battery cooling structure 301 of Third Embodiment shown in FIG. 5 will be described. The differences lie in the arrangement of a battery 510 and the arrangement of a supporter 530. The differences will be further described below.

The battery 510 is a battery pack as shown in FIG. 7. The battery 510 is a group (module) of a plurality of unit batteries 510a (cells) disposed in a row. The unit batteries 510a are disposed so that the battery heat transfer surfaces 20 of the respective unit batteries 510a are on a single plane. The entirety of the battery heat transfer surfaces 20 of the unit batteries 510a will be referred to as a battery heat transfer surface 20 of the battery 510. The unit batteries 510a are disposed so that side surfaces 25 of the unit batteries 510a are on a single plane in each side. An insulating member (not illustrated) may be provided between neighboring unit batteries 510a.

The supporter 530 supports the side surfaces 25 and the battery heat transfer surface 20 of the battery 510. The supporter 530 supports, for example, the unit battery 510a across the plurality of unit batteries 510a. The supporter 530 includes a battery heat transfer surface supporting section 531 and a side surface supporting section 533.

As shown in FIG. 8, the battery heat transfer surface supporting section 531 supports and insulates the battery heat transfer surface 20. The battery heat transfer surface supporting section 531 has the same functions as the supporter 30L and the supporter 30R (see FIG. 5) of First to Fourth Embodiments.

Each side surface supporting section 533 supports and insulates the side surface 25 of the battery 510. The side surface supporting section 533 insulates the heat sink 50 from the side surface 25. The side surface supporting section 533 insulates the outside of the battery cooling structure 501 from the side surface 25. The side surface supporting section 533 is integrated with (contiguous to) the battery heat transfer surface supporting section 531. The side surface supporting section 533 and the battery heat transfer surface supporting section 531 may be individual members. The side surface supporting section 533 extends from the battery heat transfer surface supporting section 531 along the side surface 25 toward the upper side Y2. The side surface supporting section 533 is provided to cover the entirety (or the substantially entirety) of the side surface 25. Between the side surface supporting section 533 and the side surface 25, for example, a gap is provided (this gap may not be provided). The side surface supporting section 533 is, for example, a plate in shape.

(Variations)

The embodiments above may be variously altered.

For example, a part of one embodiment may be combined with a part of another embodiment. For example, the battery 510 which is a battery pack in Fifth Embodiment shown in FIG. 7 may be combined with the arrangement not including the regions A (see FIG. 8) in First Embodiment shown in FIG. 1. For example, the battery 510 which is a battery pack in Fifth Embodiment shown in FIG. 7 may be combined with the supporter 230C in Second Embodiment shown in FIG. 4 and Fourth Embodiment shown in FIG. 6. For example, the arrangement of First Embodiment shown in FIG. 1 in which the edges 40e of the heat conduction member 40 are on the inside X1 of the edges 30e of the supporter 30L and the supporter 30R may be combined with the arrangement of Fourth Embodiment shown in FIG. 6 in which the heat conduction member 40 is provided at the position P2C.

For example, the supporters 30 shown in figures such as FIG. 1 may be different from one another in dimensions. For example, only one supporter 30 may be provided in the battery cooling structure 1.

For example, in the embodiments above, the outline 55o of the protrusion heat transfer surface 55 is positioned inside the outline 40o of the heat conduction member 40 when viewed in the direction orthogonal to the supporter non-contact part 23 (i.e., in the battery up-down direction Y). Alternatively, the outline 55o may be positioned outside the outline 40o. For example, the area inside the outline 40o when viewed in the battery up-down direction Y may be smaller than the area inside the outline 55o when viewed in the same direction.

The posture (i.e., an angle with respect to the horizontal direction) of the battery cooling structure 1 or the like is not particularly limited. The posture may be variously set on condition that the supporter non-contact part 23 of the battery 10 contacts with (e.g., is pressed onto) the protrusion heat transfer surface 55 of the heat sink 50 via the heat conduction member 40.

For example, as described above, the battery up-down direction Y may not be in parallel to the vertical direction. For example, the battery up-down direction Y may be in parallel to the horizontal direction or tilted with respect to the horizontal direction.

For example, the battery cooling structure 1 or the like of the embodiment above may be turned upside down (e.g., the upper side Y2 is on the lower side and the lower side Y1 is on the upper side).

What is claimed is:

1. A battery cooling structure comprising:
a battery;
a heat sink;
an insulating supporter provided between the battery and the heat sink and supporting the battery; and
an insulating heat conduction member provided between the battery and the heat sink;
the battery having a battery heat transfer surface which is a surface on the heat sink side,
the battery heat transfer surface including:
a supporter contact part with which the supporter contacts; and
a supporter non-contact part which is different from the supporter contact part and with which part the supporter does not contact,
the heat sink including:
a main body; and
a protrusion which is shaped to protrude from the main body toward the supporter non-contact part so as to circumvent the supporter,
the protrusion including a protrusion heat transfer surface which is a surface on the battery heat transfer surface side, and
the heat conduction member contacting with the supporter non-contact part and the protrusion heat transfer surface.

2. The battery cooling structure according to claim 1, wherein,
the heat conduction member is disposed to be successive between a position between the protrusion heat transfer surface and the supporter non-contact part and a position between the main body of the heat sink and the supporter.

* * * * *